United States Patent [19]

Brendel et al.

[11] 4,052,905
[45] Oct. 11, 1977

[54] TIRE BALANCING TRANSDUCER

[75] Inventors: Albert E. Brendel, Lake Orion; Stanley J. Rykwalder, Farmington, both of Mich.

[73] Assignee: Lebow Associates, Inc., Troy, Mich.

[21] Appl. No.: 695,664

[22] Filed: June 14, 1976

[51] Int. Cl.² .......................................... G01M 1/12
[52] U.S. Cl. ................................................. 73/483
[58] Field of Search ................. 73/65, 482, 483–486

[56] References Cited

U.S. PATENT DOCUMENTS

| | | | |
|---|---|---|---|
| 2,338,057 | 12/1943 | Petersen | 73/483 |
| 3,587,296 | 6/1971 | Povoas | 73/65 |

*Primary Examiner*—James J. Gill

[57] ABSTRACT

A device for measuring the magnitude and direction of unbalanced moments about each of two mutually perpendicular axes resulting from the displacement of the center of gravity of an object being measured, such as a tire, from the third mutually perpendicular axis. The moment sensing portion consists of two pairs of strain gage-equipped beams, one pair coincident with each of the two axes, with the intersection of the three axes corresponding with the design center of gravity of the object being measured. The sensing head is mounted on a spherical air bearing whose center of curvature corresponds with the intersection point of the three axes, so that unbalanced moments tend to cause pivotal movement about the associated axis, as permitted by yieldable flexing of the beams, while the weight of the object being measured is exerted parallel to the third axis and against the air bearing, so that such force is bypassed around the moment sensing portion to avoid damaging or influencing the sensing structure.

5 Claims, 5 Drawing Figures

4,052,905

TIRE BALANCING TRANSDUCER

BACKGROUND OF INVENTION

It is a challenge to create a system for measuring the magnitude and direction of the static unbalanced forces in a tire or tire wheel assembly resulting from the dislocation of the center of gravity of such tire from its intended location at the axis of symmetry and rotation. The task is complicated by several factors. First, the required accuracy and resolution is high, and the unbalanced moments to be measured may be extremely small. Secondly, such measurements must be made in the presence of very large forces arising from the weight of the tire or tire and wheel, which forces should preferably be bypassed around the measuring structure. This factor is further complicated by the fact that these static forces may be momentarily increased many times by the shock of loading the tire unto the measuring device or of clamping it in place. Third, for maximum accuracy and stability, it is preferable to have the sensing system at or close to the intended center of gravity of the object being measured, and therefore there is a limited amount of space available for the measuring structure.

It is common in the art of force or moment measuring to utilize electrical resistance strain gages bonded to the surface of a beam in such a fashion that the bending of the beam, which is proportional to an applied force or moment, produces a proportional change in the electrical resistance of the gage, which in turn produces an electrical signal proportional to the magnitude of the force being measured. Bending moments are commonly measured by resolving such moment into a force applied to a calibrated beam at a fixed lever arm distance from a point about which the system tries to pivot. Generally, however, such measurements do not achieve the theoretical degree of accuracy and reliability, because fabricating, space, frictional or other considerations necessitate compromises.

Accordingly, it is the principal object of the present invention to provide an improved system for measuring the unbalanced moments about two mutually perpendicular axes, such as those arising from the displacement of the center of gravity of a tire from its design point, and to achieve maximum stability and accuracy of results.

DETAILED DESCRIPTION OF THE INVENTION

Figure 1:
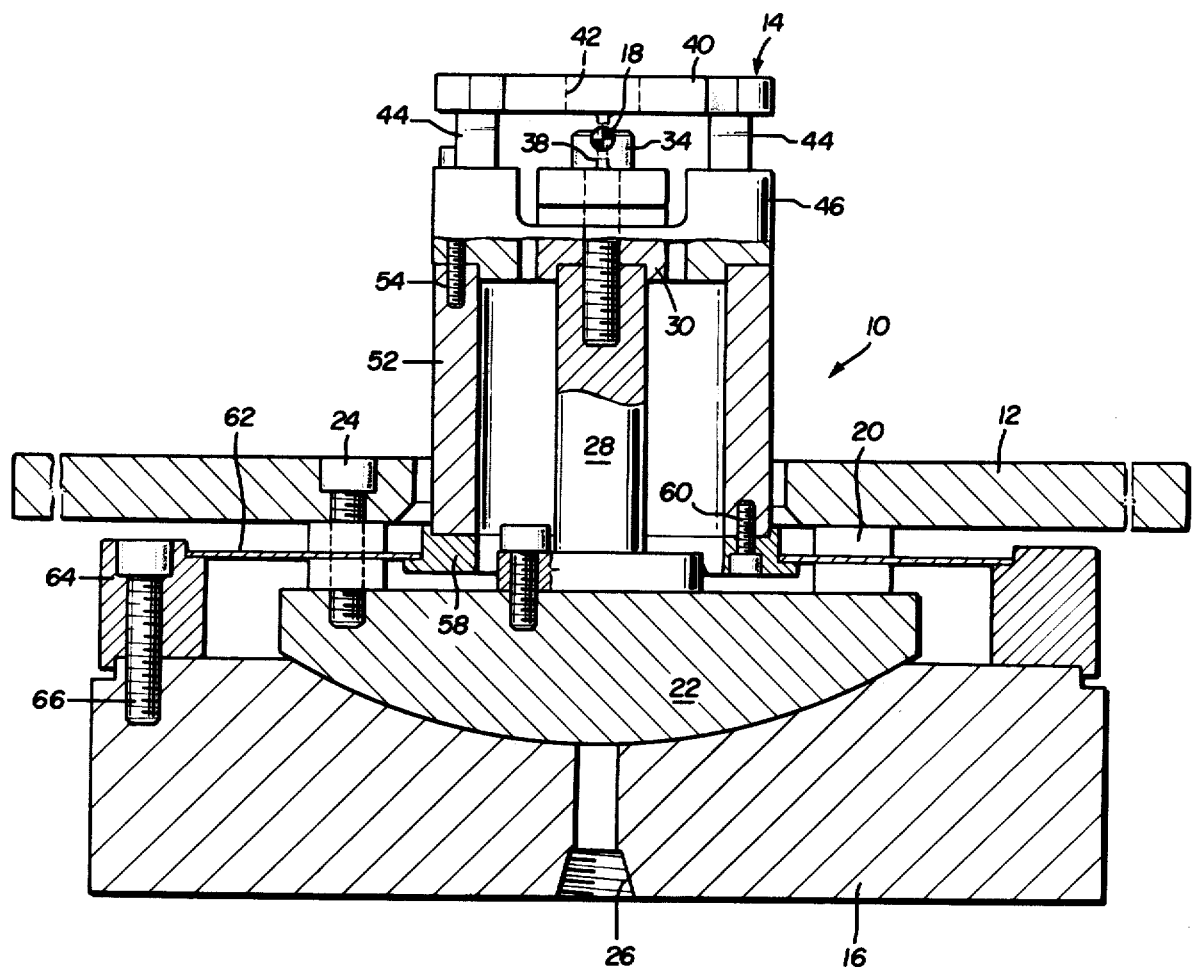
FIG. 1 is a side elevation, partly in section, of a device suitable for measuring the unbalanced moments of a tire.

Referring to FIG. 1, there is illustrated a side view of a system appropriate for the purposes of this invention. While the invention is described in the context of a device for measuring the imbalance of a tire or tire-wheel assembly about the rotational axis, it is to be understood that the invention is suitable for the broad general purpose of measuring with a high degree of accuracy small moments about each of two mutually perpendicular axis, especially in the presence of large extraneous forces along the third mutually perpendicular axis.

The tire balancing assembly 10 generally comprises an annular chuck adapter plate 12, a moment sensing structure 14 and a fixed base 16. Plate 12 functions much as a platform of a scale, with the object to be measured being placed on the plate. In this case, the tire or tire and wheel assembly (unillustrated) would be oriented in a horizontal plane (i.e., a left-right line in FIG. 1), with its axis of rotation arranged vertically to coincide with the vertical axis through the center of the illustrated structure, and with the moment sensing structure 14 projecting upwardly through the central opening of the tire or tire-wheel assembly.

The specific means by which the tire may be located and secured to the device do not form a part of this invention and have not been illustrated. However, by way of example, if a tire alone is to be measured, a split chuck can be utilized to hold and locate the tire and to simulate the function of the wheel, the chuck consisting of a lower half properly located and fixed to adapter plate 12 and an upper half which is lowered and clamped in place after the tire has been placed on the lower chuck half. Once the chuck is secured, the tire can be inflated for measurement purposes.

To protect the sensitive measuring structure from the high forces involved in the loading and chucking of the tire, appropriate means (not illustrated) may be provided for temporarily directly and rigidly supporting adapter plate 12, so that any such forces applied to the plate are effectively bypassed around the sensing structure 14. Such protective means may take the form of caliper brake cylinders which lift plate 12 slightly while supporting and locking it against rotation, thus temporarily lifting it "off" of or bypassing the sensing portion of the system.

Once the tire is chucked in place and any temporary protective supporting device is deactivated, the full weight of the tire, wheel and/or chuck is applied downwardly upon plate 12. From plate 12, such vertical forces are transmitted downwardly through a series of circumferentially spaced blocks 20 to the upper portion 22 of a spherical air bearing. These elements are rigidly interconnected by a series of screws 24. Base 16 is provided with a concave spherical surface which matches the convex spherical surface of the upper bearing portion 22. An air inlet line 26 is provided in base 16, by which air under pressure can be provided to the gap between these two spherical surfaces to maintain portion 22 in floating relationship above base 16. Such air bearings are known in the art, and the details thereof, other than its shape and location, do not form a portion of the present inventive concept.

The function of the air bearing is two-fold. First, it functions in parallel with moment sensing structure 14 to support the weight of the tire and chuck during the measuring process, and does so without introducing any stiffness or resistance to bending or pivoting of the structure induced by any unbalanced moments which are to be measured. Secondly, it provides a support for sensing structure 14 which forces structure 14 to tend to pivot about point 18, which, in addition to the functions described above, also is the center about which the spherical bearing surface is drawn.

Figure 4:
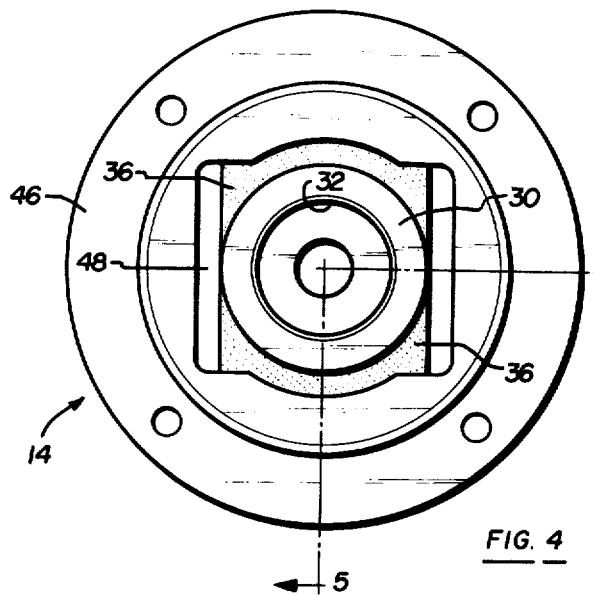
FIG. 4 is a bottom view of the structure of FIG. 2.

While the weight of the tire and chuck is absorbed by the spherical bearing, any unbalanced moments are transmitted from element 22 to moment sensing structure 14 by means of a central post 28 lying on the central vertical axis of the assembly. Post 28 is connected to central input hub 30 of the sensing structure 14, it being received in a bore 32 and secured thereto by a single central hub screw 34 (see FIGS. 1, 4 and 5).

Figure 2:
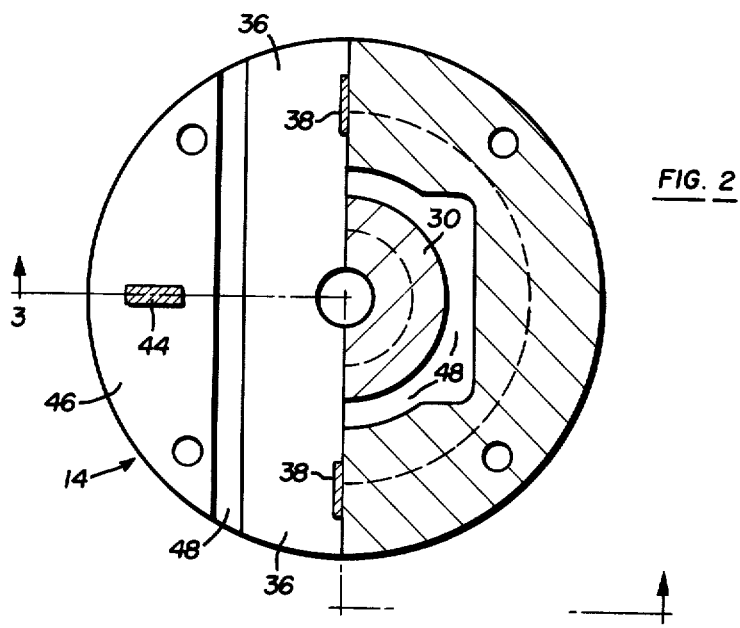
FIG. 2 is a plan view, partly in section, of the moment sensing head portion of the structure of FIG. 1, the section being taken in the direction of arrows 2—2 of FIG. 3, with the top flange 40 removed for clarity.
Figure 5:
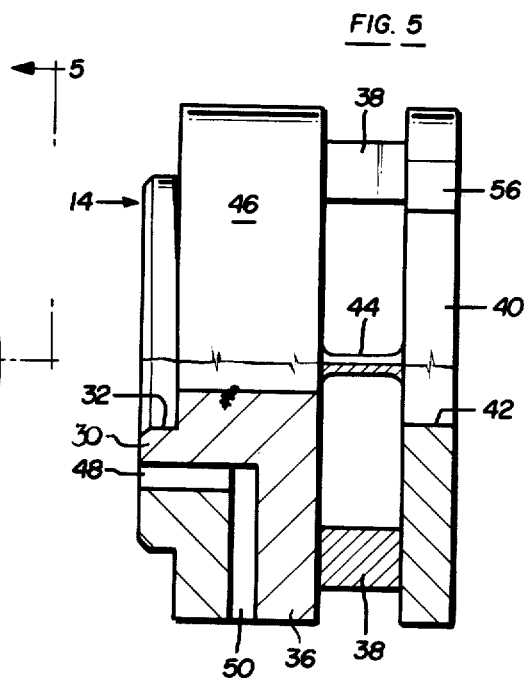
FIG. 5 is a side view, partly in section, of the structure of FIG. 4, viewed in the direction of arrows 5—5 of FIG. 4.

Hub 30, best shown in FIGS. 2-5 is generally cylindrical, but has two wing-like extensions 36 extending radially away from the central axis (see FIGS. 2 and 5, particularly). These hub extensions 36 provide a base from which upwardly projects a first pair of beams 38. Beams 38 interconnect hub 30 with a rigid top flange 40 which has a central hole 42 to provide access to socket screw 34.

A second pair of beams 44 functions to interconnect top flange 40 with a bottom annular flange 46 which is radially spaced from and surrounds the main cylindrical portion of hub 30. As best shown in FIGS. 2-5, a lateral gap 48 separates annular flange 46 from hub 30, while a vertical gap 50 spaces hub extensions 36 from annular flange 46 (see FIG. 5). For reasons which will be understood more fully below, it is essential that there by no direct contact or interconnection between hub 30 and bottom annular flange 46.

The entire moment sensing structure 14, including hub 30, extensions 36, beams 38 and 44, top flange 40 and bottom annular flange 46, is machined from a single integral block of aluminum, or other structural material.

Figure 3:
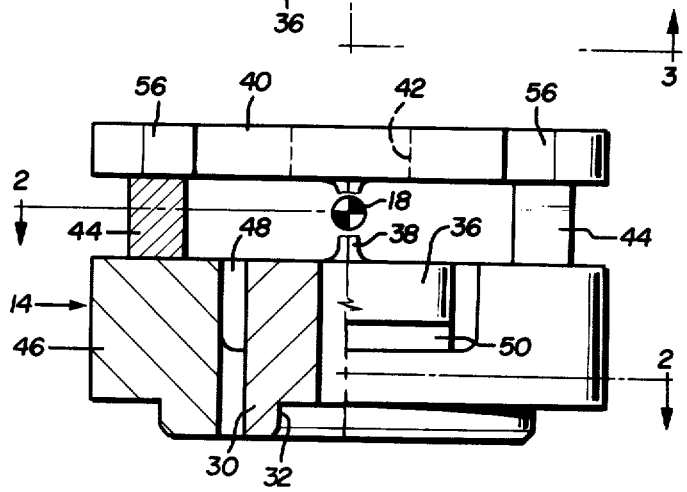
FIG. 3 is a side elevation, partly in section, of the structure of FIG. 2, viewed in the same direction as FIG. 1, with the section being viewed in the direction of arrows 3—3 of FIG. 2, with top flange 40 being restored in full unsectioned elevation. of FIG. 2, with top flange 40 being restored in full unsectioned elevation.

Bottom annular flange 46 is mounted to a tubular column 52 by means of screws 54, which are accessible by means of access slots 56 along the periphery of top flange 40 (see FIG. 3). If desired, tube 52 can be fabricated in such a fashion as to be torsionally soft about the central vertical axis, such as by providing a plurality of alternating vertical slots extending inwardly from its upper and lower edges, so that tube 52 may be torsionally yieldable about the central vertical axis. The purpose of such feature would be to further protect the moment sensing head 14 from any externally applied moments about the central vertical axis, such as might occur during chucking or by inadvertent bumping of the mechanism during operation. In other words, tube 52 would torsionally yield to allow some other auxiliary system (not shown) to be engaged which would absorb such loads.

The bottom of tube 52 is connected to an inner diaphram mounting ring 58 by means of screws 60, such ring having secured thereto a vertically yieldable metal diaphram 62 which is further provided with an outer diaphram ring 64 by which such structure is connected to base 16 by means of screws 66. Diaphram 62, which has clearance holes through which spacer blocks 20 pass, is capable of yielding vertically in response to any upward or downward movement of adapter plate 12 and upper portion 22 of the spherical bearing relative to base 16. The diaphram is, however, essentially rigid and unyielding in response to forces applied thereto in its plane.

As used in the context of the specification and claims hereof, a "rigid" element is virtually unyielding in response to forces within the range that the unit is designed to encounter. Similarly, "yieldable" or "bendable" refers to an element which resiliently yields within such force range.

Referring to FIG. 2, it will be seen that beams 38 are proportioned in cross-section to be yieldable to bending moments about the axis interconnecting them, while being unyieldable to bending moments about the perpendicular axis interconnecting beams 44. Similarly, beams 44 are proportioned to be yieldable only to bending moments about the axis interconnecting them.

As best seen in FIGS. 1-3, beams 38 and 44 are arranged so that their neutral axes intersect at a point 18 along the central vertical axis through the device. This point also coincides with the center of curvature of the spherical air bearing. Point 18 also is preferably the point which coincides with the designed center of gravity of the object being measured. If such position is not possible, then it is best to have the center of gravity below the pivot axes of the system, since a higher center of gravity location is unstable, requiring righting means to avoid unpredictable performance.

In operation, let it be assumed that the actual center of gravity of the object being measured is displaced to the right as viewed in FIG. 1 and FIG. 2, so that an unbalanced moment exists tending to pivot the structure clockwise about point 18. The weight of the object being measured is absorbed by the air bearing and base 16, as described above, but the unbalanced clockwise moment is transmitted upwardly into moment sensing structure 14 by means of post 28. Thus, moment sensing structure 14 tends to pivot clockwise about an axis extending through point 18 and perpendicularly out of the plane of the paper of FIG. 1. Such pivot axis coincides with the neutral axis of the pair of beams 38,38, which therefore tend to bend. While the input of such bending moment into beams 38 is from hub extensions 36, the output or other end of such beams "sees" a rigid, structure, since top flange 40, beams 44 and the remaining structure on down through elements 46, 52, 58, 62, 64 and 16 are rigid in response to moments about such neutral axis.

As a further explanation of the forces and moments involved, such an unbalanced moment is equal to the weight of the measured object multiplied by the lateral displacement of its center of gravity from the central vertical axis of the device passing through point 18. It is also mathematically equal to the reaction moment about point 18 as defined by the force in the plane of diaphram 62 multiplied by the vertical height from the diaphram to point 18.

If the left and right (as viewed in FIG. 1) faces of beams 38 are provided with bonded electrical resistance strain gages, such strain gages will produce a signal proportional to the magnitude of the applied unbalanced moment about the neutral axis through such beams, as will be understood by those skilled in the art. Thus, it will be seen that the unbalanced moment is measured directly at the axis about which the moment acts, without any frictional effects at such pivot axis, rather than being measured as a force applied at a known lever arm from such axis. The deflection of the sensor is truly at this axis about which it pivots. As described above, this advantageous relationship produces maximum measurement accuracy.

Similarly, if the center of gravity of the object being measured is displaced toward the bottom of FIG. 2, rather than toward the right of FIG. 2 (as in the above example), the structure will tend to pivot about the neutral axis passing through beams 44 and point 18. Beams 44 are relatively yieldable to bending moments about such axis. Such beams receive such bending moment from top flange 40, and the reaction for such moment is provided by bottom annular flange 46 and the remaining structure down through base 16, as described above. If the top and bottom (as viewed in FIG. 2) faces of beams 44 are provided with strain gages, such gages will produce a signal proportional to the bending moment about their neutral axis. And, as described above with respect to beams 38, such bending moment is measured directly at the axis about which it is applied, for maximum accuracy.

The spherical air bearing described herein is only one means by which the vertical forces may be absorbed, while at the same time permitting the unbalanced moments to be channeled into a parallel system for measurement. Alternatives include a system of upwardly converging pairs of links whose axes intersect at point 18, to restrict pivotal movement to being about such point, or a column type flexure aligned with the central vertical axis.

This invention may be further developed within the scope of the following claims. Accordingly, the above specification is to be interpreted as illustrative of only a single operative embodiment of this invention, rather than in a strictly limited sense.

We now claim:

1. An improved moment sensing device for use in a system for measuring the magnitude of moments about each of first and second mutually perpendicular axes, comprising:
   1. a rigid hub;
   2. a rigid annular ring member concentrically surrounding said hub and radially spaced therefrom relative to the third mutually perpendicular axis;
   3. a rigid force transmitting member spaced along said third axis from said hub and ring member;
   4. a first pair of bendable beams interconnecting said hub with said force transmitting member, said beams being symmetrically located on opposite sides of said third axis and having a neutral axis coincident with said first axis and being bendable only to response to bending moments about said first axis;
   5. a second pair of bendable beams interconnecting said ring member with said force transmitting member, said beams being symmetrically located on opposite sides of said third axis and having a neutral axis coincident with said second axis and being bendable only in response to bending moments about said second axis;
   6. said first and second pairs of bendable beams and said force transmitting member forming the only interconnection between said hub and said ring;
   7. said first and second pair of bendable beams each being adapted to be instrumented to produce a signal proportional to their bending stress about their respective bendable axes;
   8. whereby when moments about said first or second axes are applied to one of said hub or said ring, with the other of said hub or said ring providing a reaction moment, the appropriate pair or pairs of bendable beams will bend in such a manner to cause the instrumentation to produce a signal proportional to the magnitude of the applied moment.

2. In a system for measuring the magnitude of the unbalanced moments about each of first and second mutually perpendicular axes, where such moments are created by the displacement of an object's center of gravity from the third mutually perpendicular axis and wherein the object being measured is supported so that its designed center of gravity is coincident with the intersection point of said three axes and the force of gravity acting rhrough its center of gravity is parallel to said third axis, the improved moment sensing and weight supporting device which comprises:
   1. a base;
   2. a rigid force input means which receives the weight of the object and transmits all unbalanced moments about said first and second axes to a moment sensing means, said force input means being yieldably mounted and supported relative to said base so that the weight of the object is transmitted to said base and any unbalanced moments will cause and force input means to tend to pivot as a rigid unit about whichever axis or axes the unbalance exists;
   3. said moment sensing means comprising:
      a. first bendable means interconnecting said force input means with a rigid force transmitting means and having a neutral axis coincident with said first axis, said first bendable means being bendable only in response to bending moments about said first axis;
      b. second bendable means interconnecting said rigid force transmitting means with a rigid force output means and having a neutral axis coincident with said second axis, said second bendable means being bendable only in response to bending moments about said second axis;
      c. said first and second bendable means each being adapted to be instumented to produce a signal proportional to their bending stress about their respective bendable axes;
   4. selectively yieldable force output means interconnecting said rigid force output means and said base and being yieldable to forces parallel to said third axis, but being otherwise rigid;
   5. whereby any unbalanced moments about said first or second axes will tend to cause bending of said first or second bendable means and a resulting signal proportional to the magnitude of the corresponding unbalanced moments.

3. In a system for measuring the magnitude of the unbalanced moments about each of first and second mutually perpendicular axes, where such moments are created by the displacement of an object's center of gravity from the third mutually perpendicular axis, and wherein the object being measured is supported so that the force of gravity acting through its center of gravity is parallel to said third axis, the improved moment sensing and weight supporting device which comprises:
   1. a base;
   2. a rigid force input means which receives the weight of the object and transmits only the unbalanced moments about the first and second axis to a moment sensing means, said force input means being yieldably mounted and supported relative to said base so that such unbalanced moments about the first or second axes will cause said force input means to tend to pivot as a rigid unit about whichever axis or axes the unbalance exists, the weight of the object being transmitted directly to said base without being transmitted through said moment sensing means;

3. said moment sensing means comprising:
   a. a rigid hub;
   b. a rigid annular ring member concentrically surrounding said hub and radially spaced therefrom relative to the third axis;
   c. a rigid force transmitting member spaced along said third axis from said hub and ring member;
   d. a first pair of bendable beams interconnecting said hub with said force transmitting member, said beams being symmetrically located on opposite sides of the third axis and having a neutral axis coincident with the first axis and being bendable only in response to bending moments about said first axis;
   e. a second pair of bendable beams interconnecting said force transmitting member with said annular ring member, said beams being symmetrically located on opposite sides of the third axis and having a neutral axis coincident with the second axis and being bendable only in response to bending moments about said second axis;
   f. said first and second pair of bendable beams and said force transmitting member forming the only interconnection between said hub and said ring;
   g. said first and second pair of bendable beams each being adapted to be instrumented to produce a signal proportional to their bending stress about their respective bendable axes as induced by the unbalanced moments to be measured;

4. selectively yieldable force output means interconnecting said ring member with said base and being yieldable to forces parallel to said third axis but being otherwise rigid;

5. whereby any unbalanced moments about said first or said second axis will tend to cause bending of said first or said second bendable beams in such a manner to cause the instrumentation to produce a signal proportional to the magnitude of the corresponding unbalanced moment.

4. In a system for accurately measuring the magnitude of very small moments about each of first and second mutually perpendicular axes, wherein relatively large forces acting along the third mutually perpendicular axis are to be bypassed around the measuring means so as not to damage or influence such measuring means, the improved moment sensing and weight supporting device which comprises:
   1. a base;
   2. a moment sensing structure connected to said base by mounting means so constructed and arranged that any externally applied moments about said first or second axis will cause said moment sensing structure to tend to pivot around the respective axis, said mounting means absorbing all externally applied forces whose effective line of action is along said third axis, without transmitting said forces through said moment sensing structure;
   3. said moment sensing structure comprising:
      a. first bendable means adapted to receive all moments to be measured which are applied to said mounting means about said first and second axes and to transmit them to a rigid force transmitting means, said first bendable means having a neutral axis coincident with said first axis and being bendable only in response to bending moments about said first axis;
      b. second bendable means interconnecting said rigid force transmitting means with said mounting means and having a neutral axis coincident with said second axis and being bendable only in response to bending moments about said second axis;
      c. said first and second bendable means each being adapted to be instrumented to produce a signal proportional to their bending stresses about their respective bendable axes;
   4. whereby any unbalanced moments about said first or second axes will tend to cause bending of said first or said second bendable means and a resulting signal proportional to the magnitude of the corresponding unbalanced moments.

5. The moment sensing and weight supporting device of claim 4 wherein said moment sensing structure further comprises;
   1. first and second rigid structures radially spaced from each other about said third axis, one of said first and second rigid structures interconnecting said mounting means with said first bendable means to transmit thereto the moments to be measured, and the other of said first and second rigid structures interconnecting said second bendable means with said mounting means to absorb the reaction forces;
   2. said first bendable means comprising a first pair of beams symmetrically located on opposite sides of said third axis;
   3. and said second bendable means comprising a second pair of beams symmetrically located on opposite sides of said third axis.

* * * * *